Figure 1:
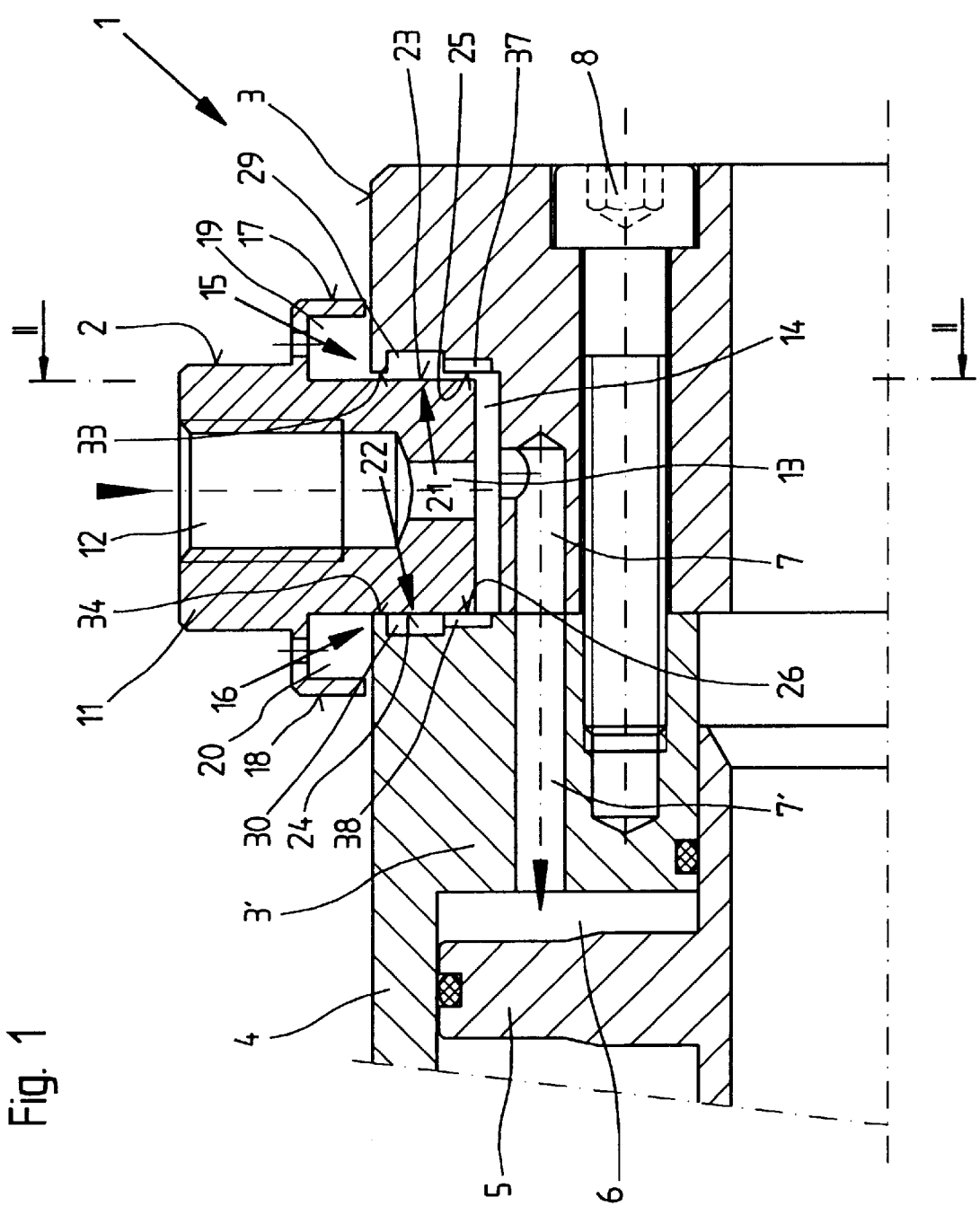

United States Patent [19]
Hiestand

[11] Patent Number: 6,145,890
[45] Date of Patent: Nov. 14, 2000

[54] DEVICE FOR SUPPLYING A PRESSURIZED MEDIUM

[76] Inventor: Karl Hiestand, Muhlweg 2, D-88630 Pfullendorf, Germany

[21] Appl. No.: 09/291,397

[22] Filed: Apr. 14, 1999

[30] Foreign Application Priority Data

Apr. 18, 1998 [DE] Germany ............... 198 17 331

[51] Int. Cl.⁷ .................................. F16L 27/08
[52] U.S. Cl. ........................ 285/190; 285/13; 285/900; 285/272
[58] Field of Search ................ 285/190, 13, 14, 285/900, 95, 98, 272, 278

[56] References Cited

U.S. PATENT DOCUMENTS

| | | | |
|---|---|---|---|
| 3,392,995 | 7/1968 | Swerdfeger | 285/900 |
| 4,139,220 | 2/1979 | Faccou et al. | 285/13 |
| 4,561,679 | 12/1985 | Choate | 285/900 |
| 4,828,292 | 5/1989 | Jansen | 285/272 |
| 4,925,219 | 5/1990 | Pollack et al. | 285/95 |
| 5,269,345 | 12/1993 | Hiestand et al. | 137/580 |
| 5,582,432 | 12/1996 | Hiestand | 285/190 |
| 5,720,503 | 2/1998 | Drijver | 285/98 |

FOREIGN PATENT DOCUMENTS

| | | |
|---|---|---|
| 2544851 | 6/1976 | Germany . |
| 3632677 | 6/1988 | Germany . |
| 4404547 | 8/1995 | Germany . |
| 2068792 | 8/1981 | United Kingdom . |

*Primary Examiner*—Eric K. Nicholson
*Attorney, Agent, or Firm*—Pandiscio & Pandiscio

[57] ABSTRACT

In a device (1) for supplying a pressurized medium from a fixed component (2) into a rotating component (3, 3'), with an axially aligned annular groove (14) and radially aligned sealing gaps (15, 16) provided between the two components, a circumferential pressure chamber (29, 30) is worked into each of the end surfaces (21, 22) which limit the radially aligned sealing gaps (15, 16), with radially aligned control slots (37, 38) connecting the pressure chambers (29, 30) to the annular groove (14). Furthermore, the end surfaces (21, 22) which are provided with pressure chambers (29, 30) are configured with equal areas.

This embodiment prevents the two components (2, 3, 3') making contact under pressure and, instead, both components (2, 3, 3') level out in a central position. As a result, trouble free operation is assured over a long period.

11 Claims, 4 Drawing Sheets

DEVICE FOR SUPPLYING A PRESSURIZED MEDIUM

The present invention relates to a device for supplying a pressurised medium from a fixed component into a rotating component, in particular for supplying a pressurised medium into a hollow clamping cylinder or the like, with an axially aligned annular groove and radially aligned sealing gaps being provided between the fixed component and the rotating component.

A rotating hollow clamping cylinder is familiar from DE 36 32 677 C2 which describes a hollow clamping cylinder provided with a device of this type for supplying a pressurised medium. For each pressurised medium supply line, there is in this case a sealing ring inserted between two surface plates clamped together with a spacer ring, with the sealing ring enclosing the radial sealing gaps together with the surface plates. The surfaces of the surface plates and the sealing ring which face towards one another are configured as flat surfaces so that, as soon as there are pressure fluctuations in one of the radial sealing gaps, the sealing ring is pressed towards the other sealing gap and against the adjacent surface plate. A high level of wear as a result of the friction forces which arise is unavoidable in this case and thus the lifetime of this device of prior art for transmitting pressurised media is very short and the device can only be used for gaseous pressurised media.

The purpose of the present invention is therefore to configure a device for supplying a pressurised medium of the type mentioned initially in such a way that contact under pressure between the two components involved in transmitting the pressurised medium is excluded, with the effect that there is no reason to expect wear resulting from increased friction. Instead, the intention is that the two components level out and always adopt a central position, both when stationary and during rotation. The constructional complexity required to achieve this should be kept at a low level whilst, nevertheless, satisfactory and trouble-free operation should always be assured over a long period.

In accordance with the present invention, this is achieved in a device for supplying a pressurised medium from a fixed component into a rotating component of the type mentioned above in that there are one or more circumferential pressure chambers worked into each of the end surfaces of the fixed component and/or the rotating component which define the limits of the radially aligned sealing gaps, with one or more radially aligned control slots connecting the pressure chambers to the annular groove between the fixed component and the rotating component, and that the end surfaces of the fixed component and/or the rotating component which define the limits of the radially aligned sealing gaps and have pressure chambers worked into them are configured in such a way that they are of equal area.

The end surfaces of the fixed component or the rotating component which define the limits of the radially aligned sealing gaps and are provided with pressure chambers can be configured in a mirror-image arrangement with regard to the transverse axis of the fixed component and with equal areas, however it is also possible for the pressure chambers and control slots for the one radial sealing gap to be worked into the fixed component or the rotating component and for the pressure chambers and control slots for the other radial sealing gap to be worked into the rotating component or the fixed component.

In this arrangement, it is advantageous for each of the end surfaces of the fixed component and/or the rotating component which are facing one another to be provided with an inner sealing surface of equal area, with one or more pressure chambers and an outer sealing surface of equal area, in which case the inner sealing surfaces provided on the end surfaces of the fixed component and/or the rotating component should be dimensioned such that they are approximately twice the size of the outer sealing surfaces, whilst the surfaces of the pressure chambers which are subjected to pressure in the axial direction should be larger in size than the inner sealing surfaces of the radial sealing gaps. Furthermore, the pressure chambers should be configured with a rectangular cross-section.

When there are two or more pressure chambers worked into the fixed component and/or the rotating component, it is appropriate for each of them to be connected to the axially aligned annular groove and between themselves via one or more control slots.

Each of the control slots for the two radial sealing gaps should have a cross-sectional surface of the same size, whilst it is also appropriate for the fixed component to be configured as an annular disc and to allow it to engage in the rotating component. Furthermore, each of the radially aligned sealing gaps can be covered by a collecting chamber formed by a web which, in a preferred embodiment, is formed onto the fixed component.

If a device for supplying a pressurised medium from a fixed component into a rotating component is configured in accordance with the present invention, it can be guaranteed that damage to the fixed component and/or the rotating component due to friction in the area of the radial sealing gaps can be practically excluded. Instead, both components always level out in a middle position both when stationary and during rotation, as well as in the event of a sudden supply of pressurised medium, therefore affording reliable pressure against contact under pressure on one side. Consequently, a long service life is guaranteed, particularly since no impurities which may be present in the pressurised medium can build up the radial sealing gaps which vary continuously in width and in the control slots in the leakage oil flow. The device in accordance with the present invention therefore represents a very straightforward design configuration and is economical to manufacture, whilst providing for the operationally reliable and trouble-free transmission of a pressurised medium, even one under high pressure, at high speeds of rotation and over a long period.

Figure 2:
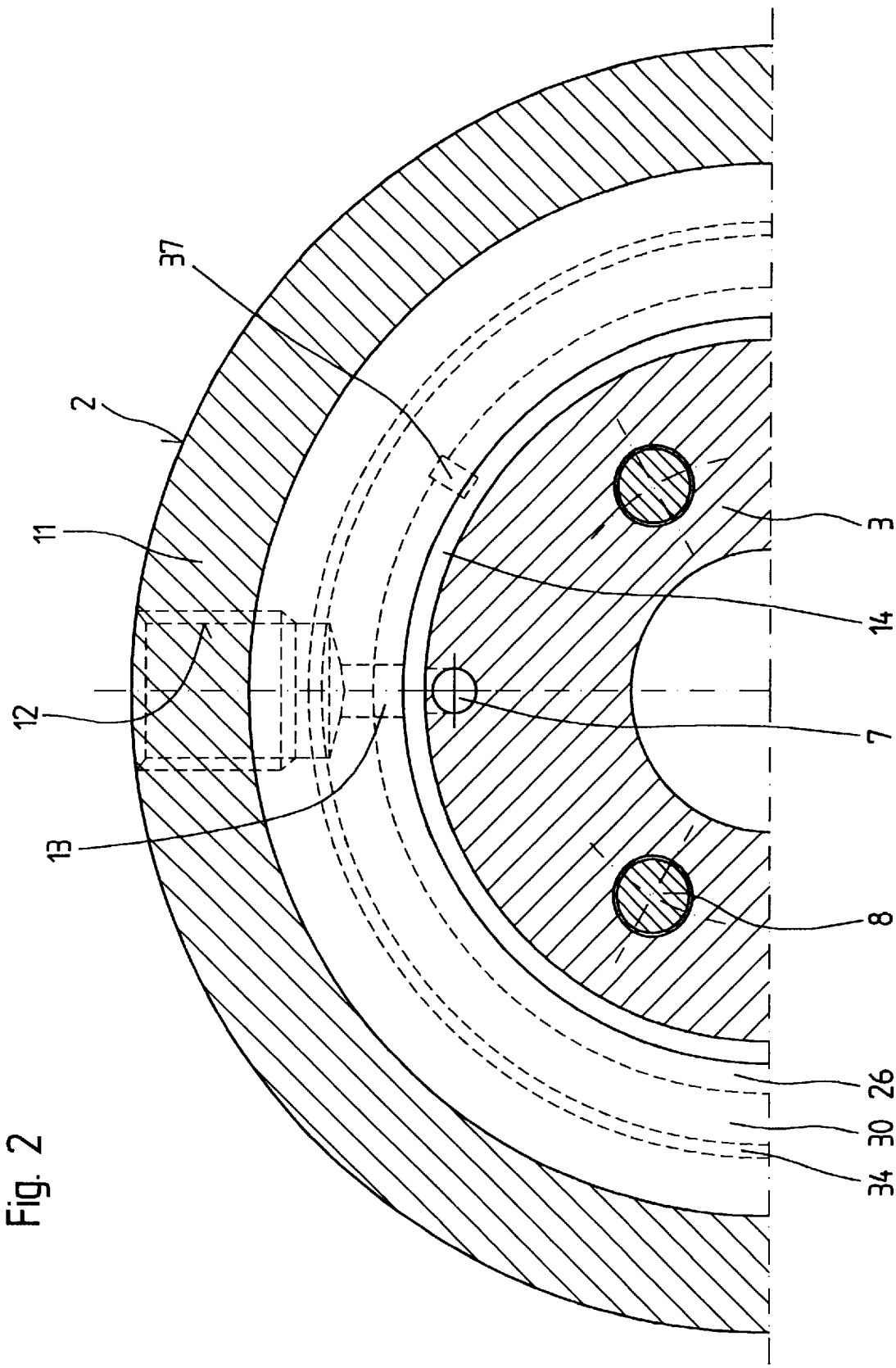
Figure 3:
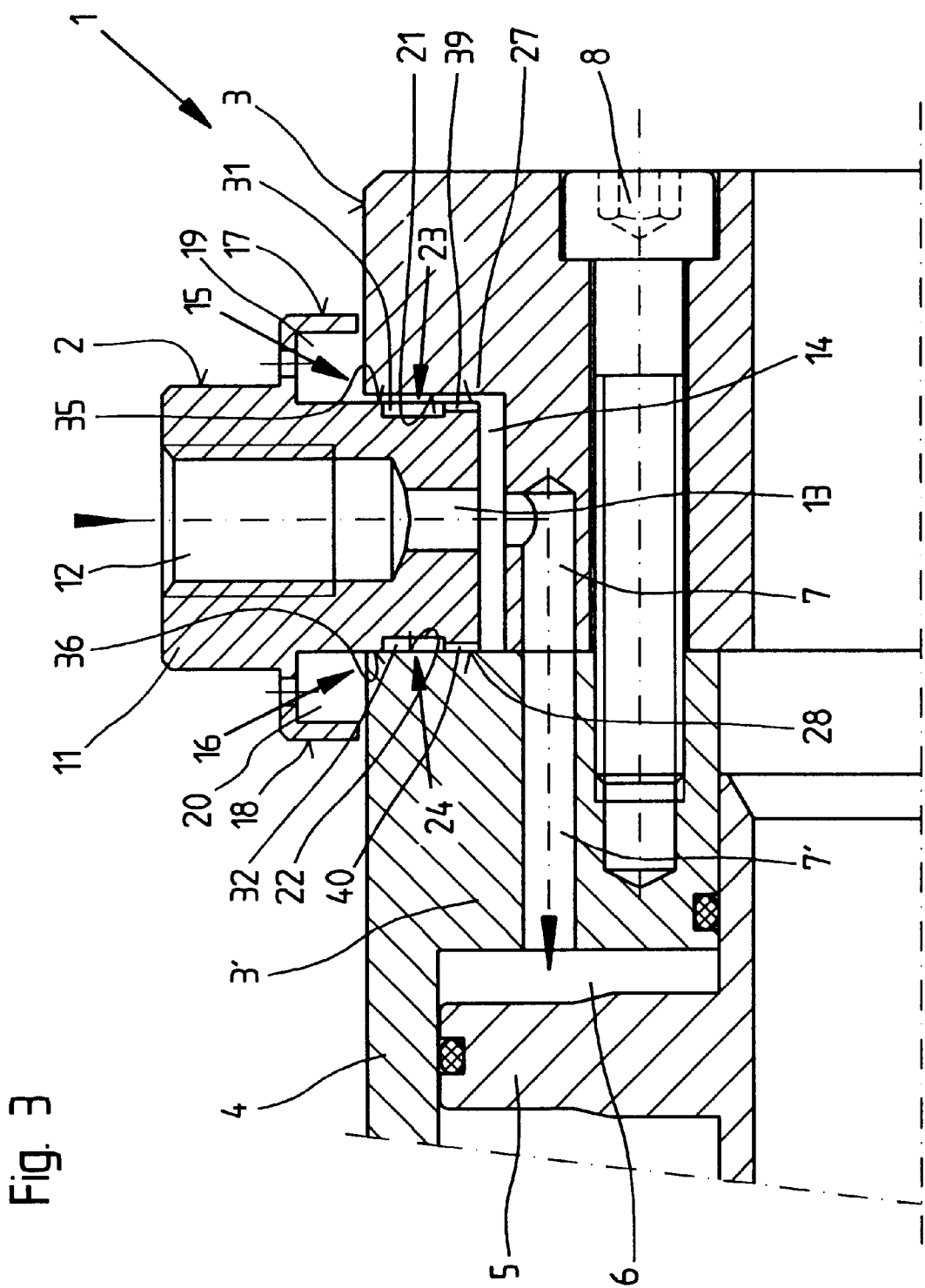
Figure 4:
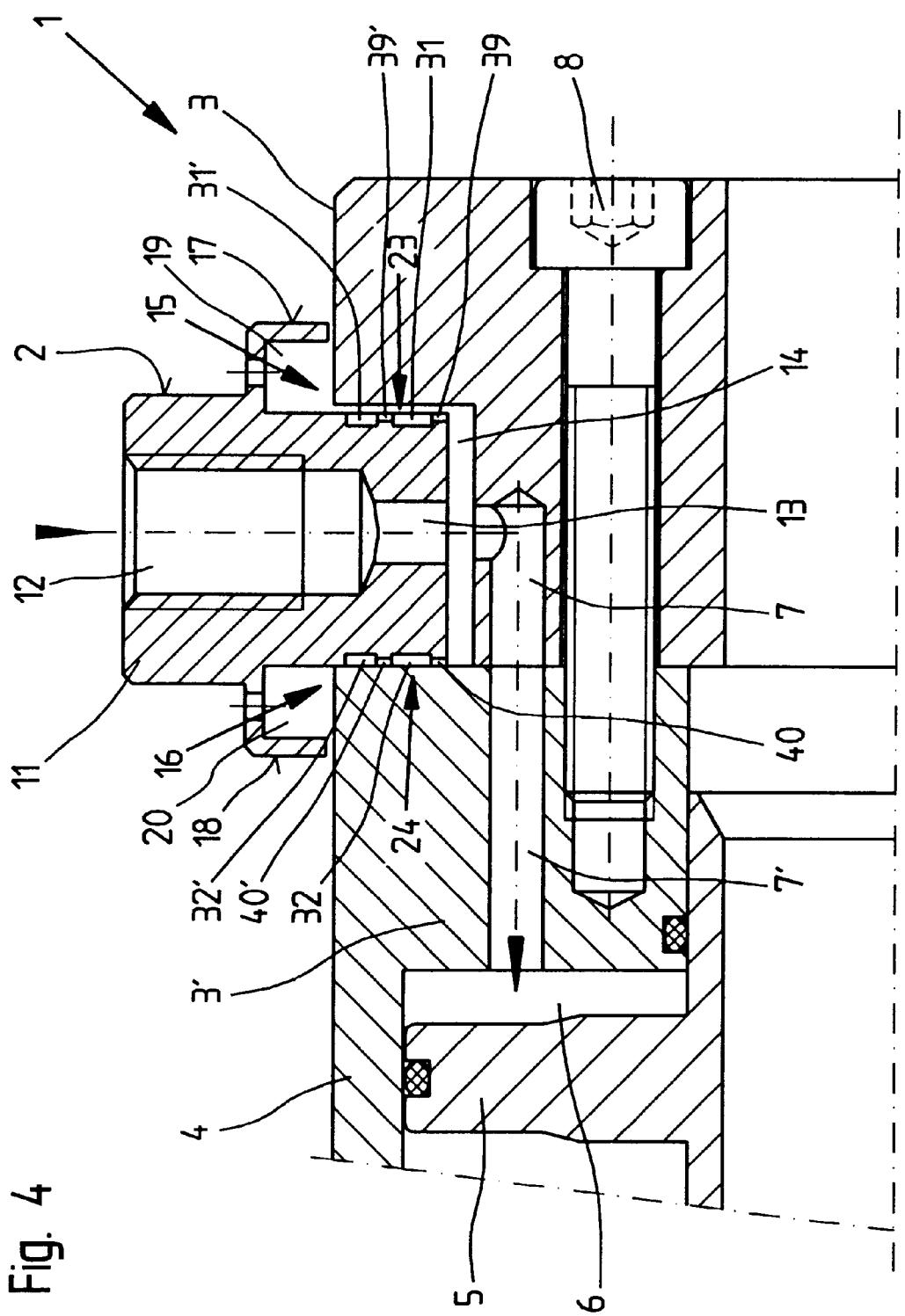

The drawing shows a sample embodiment of a device configured in accordance with the present invention for supplying a pressurised medium from a fixed component into a rotating component, the details of which are explained below. In the drawing, FIG. 1 shows the device for supplying a pressurised medium mounted onto a hollow clamping cylinder, in an axial section, FIG. 2 shows a section along line II—II in FIG. 1, FIG. 3 shows the device for supplying a pressurised medium in accordance with FIG. 1 with pressure chambers provided on the fixed component and FIG. 4 shows the device for supplying a pressurised medium in accordance with FIG. 3 with two pressure chambers, each of which are arranged concentrically.

The device shown in FIGS. 1 to 4 and identified with the number 1 is used for supplying a pressurised medium, for example oil under pressure, from a fixed component 2 into a two-part rotating component 3, 3' and to a hollow clamping cylinder 4 connected to the rotating component 3, 3' by means of bolts 8. A piston 5 which can be acted upon by the pressurised medium is inserted into the hollow clamping cylinder 4, the cylinder wall of which forms component 3' in the illustrated embodiment, with the pressure space 6 allocated to the piston 5 being connected to rotating component 3 by ducts 7, 7' provided in the rotating component 3, 3' for supplying the pressurised medium.

The fixed component 2 is configured as a disc 11 and it engages with the rotating component 3, 3' with a radial clearance, so that an axially aligned annular groove 14 is formed between the components 2, 3, 3' and radial sealing gaps 15 and 16 are formed on both sides of the fixed component 2. Furthermore, the disc 11 is provided with a connection 12 for a supply line for pressurised media (not shown) and a duct 13 which opens out into the annular groove 14. Also, the duct 7 worked into the rotating component 3 is connected to the annular groove 14, so that the pressurised medium being supplied flows into the pressure space 6 of the hollow clamping cylinder 4 through the duct 13, annular groove 14 as well as ducts 7 and 7'.

The end surfaces 21 and 22 of the rotating component 3, 3' which limit the radial sealing gaps 15 and 16 are configured in a special way in order to prevent contact with the fixed component 2 under pressure, namely with a pressure chamber 29 or 30 worked into each of the end surfaces 21 and 22 and connected to the annular groove 14 via control slots 37 or 38 with equal area. Consequently, each of the end surfaces 21 and 22 have an inner sealing surface 25 or 26, pressure chambers 29 or 30 and an outer sealing surface 33 or 34. With regard to the transverse axis of the disc 12, the end surfaces 21 and 22 are thus configured in a mirror-image arrangement to one another and with equal areas, with the innter sealing surfaces 25 and 26 being about twice the size of the outer sealing surfaces 33 and 34. Also, the surfaces of the pressure chambers 29 and 30 against which pressure acts in an axial direction are rectangular in cross-section and larger than the inner sealing surfaces 25 and 26. This makes it possible for the two components to level out in relation to one another rapidly.

If pressurised medium is supplied to the hollow clamping cylinder 4 via the fixed component 2 and the rotating component 3, a static pressure is established in the pressure space 6 and the annular groove 14. When components 2 and 3 are located in relation to one another as shown in FIG. 1, part of the pressurised medium escapes through the increased radial sealing gap 15 into a collection chamber 19 formed by a web 17 formed onto the disc 12. However, the opposite radial sealing gap 16 is practically closed due to the contact between the outer sealing surface 34 and the disc 12, whilst the pressure chamber 30 is connected to the annular groove 14 by way of the control slot 38, pressure is built up in the annular groove 14, thereby exerting an axial force onto the two components 2 and 3. As a result, the outer sealing surface 34 is lifted off the disc 12 so that pressurised medium can flow into a collection chamber 20 for the radial sealing gap 16, with the collection chamber 20 being formed by a web 18, after which the pressurised medium is channeled back into the pressurised medium circuit from the collection chamber 20 as well as the collection chamber 19. At the same time, the radial gap 15 is more or less closed and so the two components 2 and 3 continuously describe levelling-out movements when a pressurised medium is supplied using the device 1 and conditions of equilibrium are established over and over again for short periods. A controlled outflow of pressurised medium through the radial sealing gaps 15 and 16 is accepted, whilst contact under pressure between the two components 2 and 3—which could lead to damage to the components—is reliably avoided by the levelling-out procedure.

In the embodiment shown in FIG. 3, pressure chambers 31 and 32 are worked into the end surfaces 23 and 24 of the fixed component 2 and are connected to the annular groove via control slots 39 and 40. The inner sealing surfaces 27 and 28 as well as the outer sealing surfaces 35 and 36 are thus provided on the disc 11 of the fixed component 2 whilst the end surfaces 21 and 22 of the rotating component 3, 3' have flat surfaces.

Furthermore, it is also possible to provide two or more pressure chambers located concentrically in one of the two components 2 or 3. In accordance with FIG. 4, two concentric annular chambers 31 and 31' or 32 and 32' are worked into both of the end surfaces 23 and 24 of the disc 12 of the fixed component 2, with control slots 39' or 40' connecting the annular chambers 31 and 31' or 32 and 32' together. The outer pressure chambers 31' and 32' are therefore also connected to the annular groove 14, so that a pressure can be built up in them. Also, since in all embodiments the end surfaces 21, 22 or 23, 24 which are provided with pressure chambers 29, 30 or 31, 32 or 31, 31' or 32, 32' are configured in regard to the transverse axis of the disc 11 in a mirror-image arrangement to one another and with equal areas, it is not possible for one of the two components 2 or 3 to be moved in one direction; instead, the width of the radial gaps 15 and 16 is always set to a constant value.

What is claimed is:

1. A device (1) for supplying a pressurised medium from a fixed component (2) into a rotating component comprising a hollow clamping cylinder (4), the rotating component having an annular groove (14) in which is disposed the fixed component and the fixed component and rotating component defining radially extending sealing gaps (15, 16) between the fixed component (2) and the rotating component (3, 3'), wherein circumferential pressure chambers (29, 30 or 31, 32 or 31, 31', 32, 32') are disposed in each of surfaces (21; 22 or 23, 24) of a selected one of the fixed component (2) and the rotating component (3, 3'), which pressure chambers define limits of the sealing gaps (15, 16), and wherein control slots (37, 38 or 39, 40 or 39, 39', 40, 40') connect the pressure chambers (29, 30 or 31, 32 or 31, 31', 32, 32') to the annular groove (14) between the fixed component (2) and the rotating component (3, 3'), and wherein the end surfaces (21, 22 or 23, 24) are of equal areas.

2. The device in accordance with claim 1, wherein the end surfaces (21, 22 or 23, 24) are provided with the pressure chambers (29, 30 or 31, or 32 or 31, 31', 32, 32') which are configured in a mirror-image arrangement with regard to a transverse axis of the fixed component (2).

3. The device in accordance with claim 2, wherein the pressure chambers (29) and control slots (37) for one of the radial sealing gaps are disposed in a selected one of the fixed component (2) and the rotating component (3), and the pressure chambers (32) and control slots (40) of the other radial sealing gaps are disposed in the other of the rotating component (3) and the fixed component (2).

4. The device in accordance with claim 1 wherein each of the end surfaces (21, 22 or 23, 24) of the fixed component (2) and the rotating component (3, 3') which are facing one another are provided with an inner sealing surface (25, 26 or 27, 28) of equal area, with pressure chambers (29, 30 or 31, 32 or 31, 31', 32, 32') and an outer sealing surface (33, 34 or 35, 36) of equal area.

5. The device in accordance with claim 4, wherein the inner sealing surfaces (25, 26 or 27, 28) provided on the end surfaces (21, 22 or 23, 24) of the fixed component (2) and the rotating component (3, 3') are dimensioned such that the inner sealing surfaces are about twice a size of the outer sealing surfaces (33, 34 or 35, 36).

6. The device in accordance with claim 4, wherein surfaces of the pressure chambers (29, 30 or 31, 32) which are subjected to pressure are larger in size than the inner sealing surfaces (25, 26 or 27, 28) of the radial sealing gaps (15, 16).

7. The device in accordance with claim 4 wherein the pressure chambers (29, 30 or 31, 32) are each configured with a rectangular cross-section.

8. The device in accordance with claim 4 wherein there are two pressure chambers (31, 31' or 32, 32') disposed in a component each pressure chamber is connected to the annular groove (14) and is connected to the other of the two pressure chambers by a control slot (39, 39' or 40, 40').

9. The device in accordance with claim 4 wherein each of the control slots (37, 38, or 39, 40) for the two sealing gaps (15, 16) has a cross-sectional surface of the same size.

10. The device in accordance with claim 1, wherein the fixed component (2) is configured as an annular disc (11) and engages in the rotating component (3).

11. The device in accordance with claim 1 wherein each of the sealing gaps (15, 16) is covered by a collecting chamber (19, 20) formed by a web (17, 18) which is formed onto the fixed component (2).

* * * * *